United States Patent [19]

Wells

[11] Patent Number: 4,886,283

[45] Date of Patent: Dec. 12, 1989

[54] RECREATIONAL VEHICLE

[76] Inventor: Robert R. Wells, 15 Fairwood View Ct., Phoenix, Md. 21131

[21] Appl. No.: 220,611

[22] Filed: Jul. 18, 1988

[51] Int. Cl.[4] .............................................. B62B 13/00
[52] U.S. Cl. .................................. 280/14.1; 280/844; 280/28.14; 280/87.021
[58] Field of Search ................ 280/12 K, 12 KL, 128, 280/607, 11.1 ET, 11.1 BT, 633, 14.1, 28.4, 28.5, 11.16, 11.26, 87.021

[56] References Cited

U.S. PATENT DOCUMENTS

| | | | |
|---|---|---|---|
| 768,977 | 8/1904 | Clark et al. | 280/12 K |
| 3,190,668 | 6/1965 | Husak | 280/12 K |
| 4,310,169 | 1/1982 | Brough | 280/12 K |
| 4,324,409 | 4/1982 | Larsen et al. | 280/12 F |
| 4,440,408 | 4/1984 | Velman | 280/12 KL |
| 4,537,412 | 8/1985 | Hill | 280/12 K |
| 4,572,528 | 2/1986 | McBride | 280/11.1 ET |

FOREIGN PATENT DOCUMENTS

| | | | |
|---|---|---|---|
| 1049593 | 2/1979 | Canada | 280/12 K |
| 2538257 | 6/1984 | France | 280/607 |

*Primary Examiner*—David M. Mitchell
*Attorney, Agent, or Firm*—Edward D. C. Bartlett

[57] ABSTRACT

A recreational vehicle including a runner, such as a ski, and a seat for a rider supported by a pedestal on the runner. The ski may take the form of a snow ski or grass ski. The pedestal may be permanently or removably secured to the runner. The seat may also be shock-mounted and, if desired, two seats may be mounted in tandem on the runner.

20 Claims, 7 Drawing Sheets

RECREATIONAL VEHICLE

FIELD OF THE INVENTION

This invention relates generally to recreational vehicles, and more particularly to a sled-like vehicle with one runner.

BACKGROUND OF THE INVENTION

In man's quest for entertainment and sport, many items have been developed, among which are several which provide means for traveling down snow covered and grass covered slopes. Examples are what are now conventional snow skis which permit the skier to advance on one's feet and toboggans and snow sleds which permit the riders to advance while seated or lying down. Only recently, snowboards have gained in popularity, such boards being similar to a surfboard without a rudder. However, snowboards have only rudimentary guidance capabilities and require great skill and agility of the rider.

SUMMARY OF THE INVENTION

This present invention combines the attributes of a ski with those of a sled permitting the rider to ski on one runner while seated on it, steering the vehicle by balancing the body on it in much the same manner as steering a bicycle.

An object of the present invention is to provide a new recreational vehicle that provides different and enjoyable attributes.

A further object of the invention is to provide a vehicle having the attributes of a ski while at the same time permitting the rider to advance while seated, but also providing a measure of steering control.

Accordingly, there is provided by the present invention, a recreational vehicle comprising a seat member attached to a single runner for guided downward advancement along a slope by a rider sitting on a seat portion of the seat member. The runner may be of the type used on snow or the type used on grass.

In one embodiment of the invention, a seat is permanently affixed to a central portion of a conventional ski, preferably by a suitable support. Preferably, handles are provided on the sides of the seat to provide stability for the rider while permitting him/her to lean right or left to steer the vehicle as it advances down a snow covered slope.

In the preferred embodiment, the seat is modified to fit in conventional ski bindings which permit the user to utilize one of a pair of almost any existing conventional skis. This saves the expense of buying a complete assembly and, in fact, by using two seat assemblies, two vehicles result from the use of a single pair of skis. In addition, since the seat is easily dismountable from the ski, the two separate parts are easier to store, transport, and/or carry, by either walking or using a chair lift-/gondola to the top of a snow covered slope.

The invention may be further modified by providing two seats in tandem on a single ski, either permanently or by the use of ski bindings. This permits two riders to simultaneously ride the same ski.

In any of the embodiments, either the single seat or double seat may be attached to the ski by springs or shock absorbers to provide a less rigid mounting. A foot rest in front of the seat or seats may also be provided although, usually, the legs and feet are used to balance the rider during steering, turning, and banking.

The seat portion of the or each seat member is preferably spaced above the single ski or other runner on and by a pedestal extending upwardly from a central portion of the ski or other runner.

Although the seat or seats are preferably mounted on a conventional snow ski, the foregoing embodiments may also be adapted to mount the seat on a so-called grass ski which utilizes a plurality of rollers traveling around a closed track, or on a snow ski type runner with small wheels mounted on the runner. This provides a single runner, sled-like vehicle suitable for ski-sledding down a grass covered slope.

Other objects, features and advantages of the present invention will become more fully apparent from the following detailed description of the preferred embodiments, the appended claims and the accompanying drawings.

BRIEF DESCRIPTION OF THE DRAWINGS

In the accompanying drawings, in which like parts are designated by like reference characters.

DETAILED DESCRIPTION OF THE PREFERRED EMBODIMENTS

Figure 1:
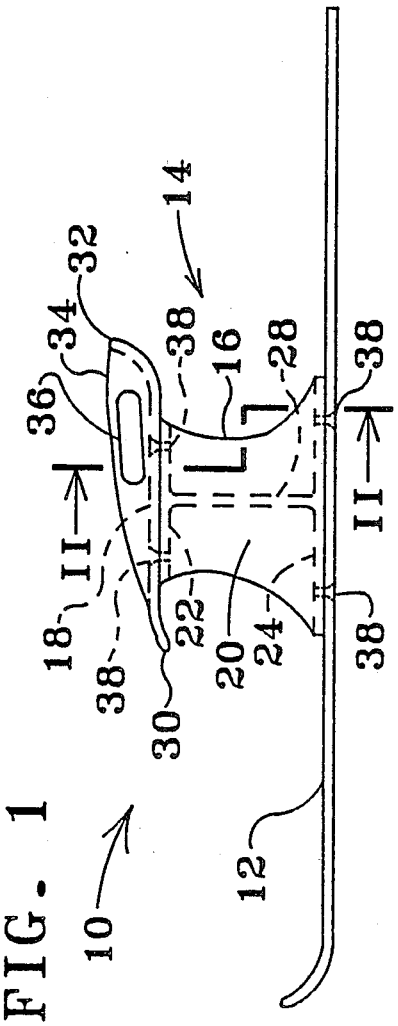
FIG. 1 is a side elevation of a seat member attached permanently to a single snow ski according to the present invention.

Referring now to FIG. 1, an embodiment of the ski-sled 10 of the present invention includes a conventional snow ski or runner 12 on which is permanently mounted a seat member 14. The ski 12 may be of the laminated wood or fiber glass type but the laminated metal type, such as aluminum or steel, is preferred because it has sharper outer edges which provide better control by the rider when leaning to the right or left for steering.

The seat member 14 is mounted to the ski 12 by a pedestal 16 affixed both to the seat portion 18 and to the ski 12. The height of the pedestal 16 is such that, when combined with the thickness of the seat portion 18, the top of the seat will be about fourteen inches above the top of the ski 12. This approximate height varies for small and large children or adults. The central portion of the pedestal 16 is affixed to the central portion of the ski 12 at about the point where the center of a conventional ski boot with ski bindings would be mounted.

The pedestal 16 may be of any number of configurations such as a center pedestal braced by struts (not shown). For purposes of illustration, the pedestal 16 is a unitary member having two sides 20 (FIG. 2) spaced apart by a top web 22 and bottom web 24 about equal to the width of the ski 12. Pedestal 16 may be made from one of many rigid materials but molded urethane is preferred for strength, lightness, and molded-in color. Apertures (not shown) may be provided in the sides 20 for appearance if desired and to lighten the pedestal. A center web 28 is preferably included to provide lateral stability, that is to prevent trapezoidal collapse. The web 28 extends between and is rigidly secured to the top and bottom webs 22, 24; the center web 28 may be integrally formed with the pedestal 16.

The seat portion 18 may also be made from a number of materials, but again molded urethane is preferred for the same reasons as for the pedestal 16. The seat portion is preferably molded with a down turned front edge 30 for comfort of the rider's legs and an upturned rear edge to support the rider's buttocks as he/she leans backwards in use. Seat portion 18 also preferably includes upturned sides 34 for sideways support during leaning by the rider. Advantageously, the sides 34 may be provided with hand holes 36 therethrough which the rider can grasp to control the ski-sled 10. If preferred, separate handles (not shown) may be attached to the sides 34 for the same purpose.

The pedestal 16 may be attached to both the ski 12 and the seat portion 18 by conventional flat head screws 38, four of such screws passing through the bottom of the ski and into threaded holes in the bottom of the bottom web 24; another four screws 38 pass through the seat portion 18 and into threaded holes in the top web 22. This arrangement provides rigidity to the structure, providing a substantially unitary structure comprising the seat, pedestal, and ski.

Figure 3:
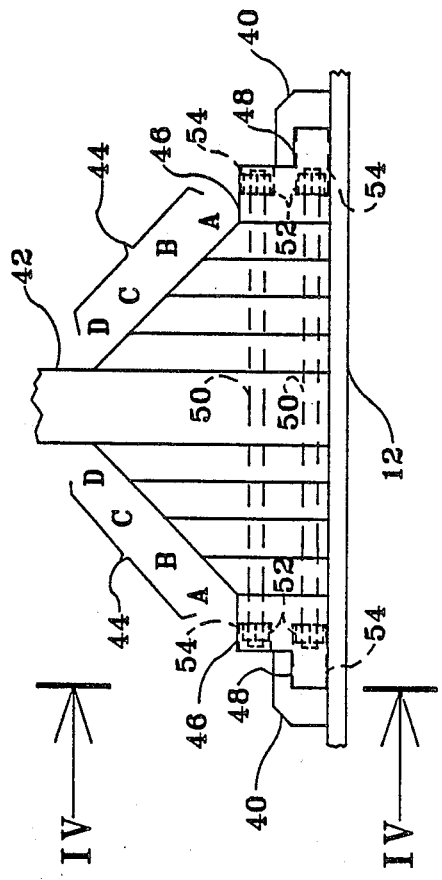
FIG. 3 is a side elevation according to another embodiment of the invention of a portion of a seat member attached to a snow ski by means of conventional ski bindings and showing spacers used to adapt the seat member to different sizes of ski bindings.

Referring now to FIG. 3, this is the preferred embodiment of the invention, and the pedestal 16 is specially adapted to be removably mounted to the ski 12 by utilizing conventional ski bindings or mounts for mounting ski boots. The mounts 40 are depicted schematically and intended to illustrate conventional mounts fixed to the ski that clamp a ski boot in place, including a quick-release feature, as well known by those skilled in the art. Thus, this advantageously permits a pair of skis to be used for skiing in the usual manner, and enables one or both of the pair of skis to be quickly converted into one or a pair of ski-sleds 10.

Figure 2:
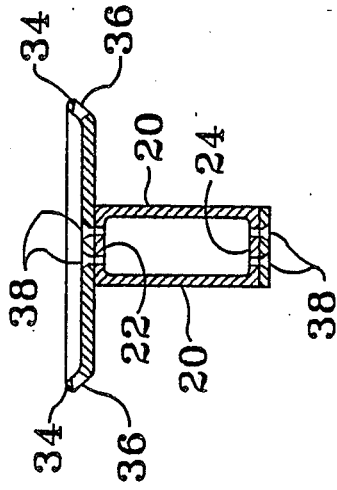
FIG. 2 is a section view taken along the line II-II in FIG. 1.

To utilize the mounts 40, the pedestal 16 previously described in connection with FIGS. 1 and 2 is modified as illustrated in FIG. 3 and identified by numeral 42. In the modification, the pedestal 42 is rectangular in cross-section with its width extending across the width of ski 12. It may be secured to the seat portion 18 (not shown in FIG. 3) in substantially the same manner as pedestal 16 is attached to the seat portion 18 in FIG. 1. The pedestal may be made from urethane or similar plastic as described for pedestal 16, or of metal, or even wood.

Figure 4:
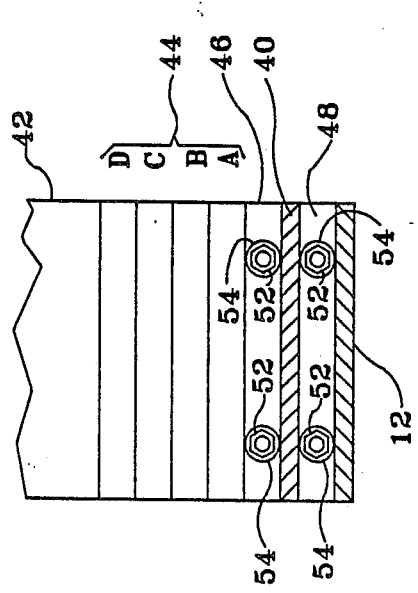
FIG. 4 is a section view of the embodiment of FIG. 3 taken along the line IV-IV in FIG. 3.

So that the pedestal 42 will fit the boot size for which the mounts 40 are spaced apart on the ski, a plurality of vertical spacers 44A, B, C, and D are provided in thicknesses equal to ½ boot size increments. As illustrated in FIG. 3, the spacers may be of different lengths to provide a tapered support for the pedestal 42. The widths of the spacers 44 extend across the width of the ski 12 as shown in FIG. 4. Such spacers may be made of the same or different materials than is the pedestal 42. The number of spacers used will depend on the boot size that the mounts 40 are spaced for on the ski 12, with spacer 44A being selected first, then 44B and so on to maintain the tapered configuration.

Two adaptors 46 secure the spacers 44 tightly against the pedestal 42 and are themselves directly captured in the mounts 40 as illustrated in FIG. 3. Each adaptor 46 includes a protruding lug portion 48 of such size and shape to conform to the requirements of the conventional mounts 40 for clamping the adaptors 46 to the ski 12. Four all-threaded rods 50 pass through the adaptors 46, spacers 44, and pedestal 42, as shown in FIGS. 3 and 4. Threaded nuts 52 are seated in recesses 54 in the adaptors 46 and tightened on rods 50 to clamp all the elements securely together. As will be appreciated, the rods 50 extend parallel the base of the ski 12 in the lengthwise direction of the ski 12.

Figure 5:
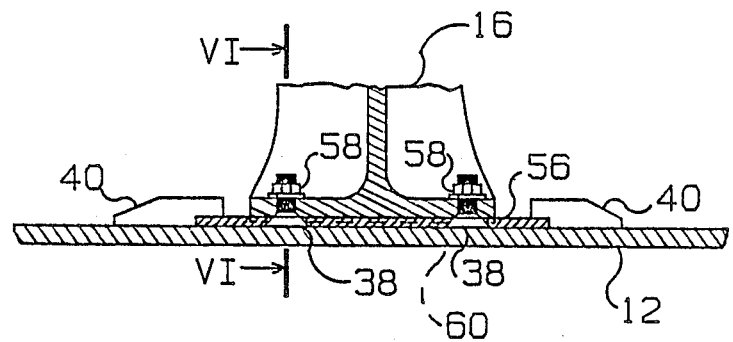
FIG. 5 is a side elevation in section of a portion of a seat member attached to a snow ski taken along the line V-V of FIG. 6 showing an adaptor for securing the seat member to conventional ski bindings.
Figure 6:
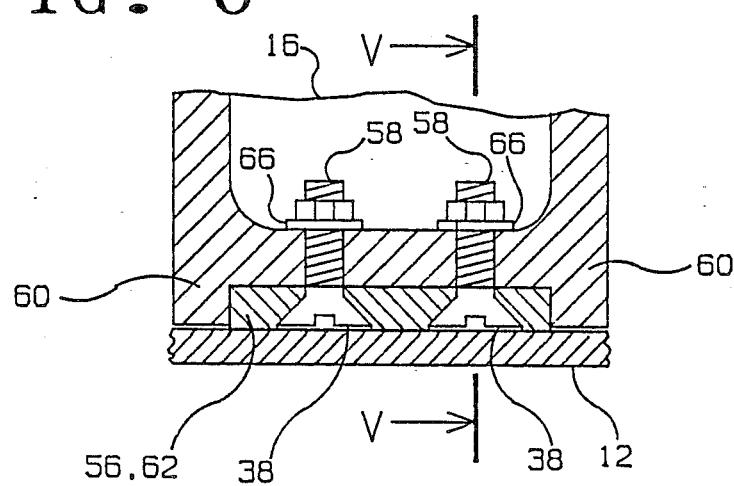
FIG. 6 is a front elevation in section of the embodiments of the invention of both FIG. 5 and FIG. 7 taken along the line VI-VI in both figures.

Rather than the pedestal 42 and multiple spacers arrangement shown in FIGS. 3 and 4, the pedestal 16 of FIGS. 1 and 2 may be utilized with a single, horizontal spacer 56 as shown in FIGS. 5 and 6. In this arrangement, the length of the spacer 56 is selected for the boot size spacing between the conventional mounts or ski bindings 40 and is readily releasably clamped to the ski by the mounts 40 as in the same way as a ski boot would be so clamped. The screws 38, instead of passing through the ski 12, pass through the horizontally disposed spacer 56 and into threaded holes in pedestal 16 or preferably into nuts 58 which, when tightened, clamp the spacer 56 tightly to the pedestal. In this manner, the pedestal 16 and spacer 56 assembly may be quickly mounted to the ski 12 and quickly dismounted from the ski by clamping and releasing, respectively, the ski bindings 40. If desired, the pedestal 16 may be slightly modified to include downwardly extending side flanges 60 which overlap the outer lateral sides of the spacer 56 for added lateral support and alignment, as shown in the section of FIG. 6 (FIG. 6 advantageously serves as a section for both FIG. 5 and FIG. 7 to be described).

Figure 7:
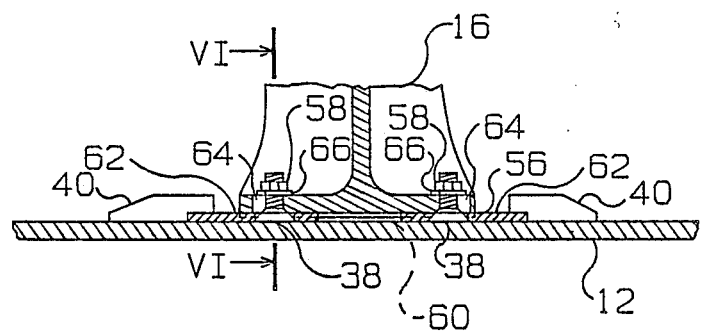
FIG. 7 is a side elevation similar to FIG. 5 showing the adaptor modified so as to fit any size ski bindings.

The spacer 56 may also be modified as shown in FIG. 7 wherein it is formed by two identical halves, each denoted by numeral 62. In this arrangement, the halves 62 are slidably clamped to the pedestal 16 so that the halves may be spaced to accommodate the spacing between mounts 40. This obviates the need for different length spacers 56. The pedestal 16 includes elongated slots (in the direction of the length of the ski 12) so that the halves 62 may be spaced as desired and then clamped in place by screws 38 and the nuts 58 tightened against washers 66 overlying the slots 64.

Figure 8:
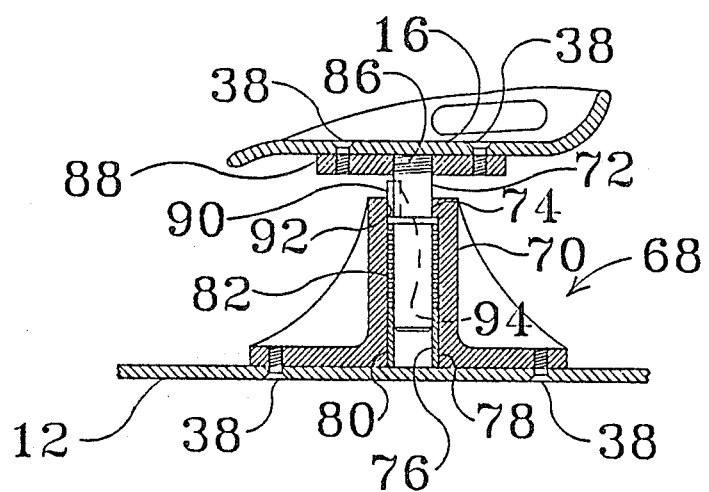
FIG. 8 is a side elevation in section similar to FIGS. 5 and 7 but showing a seat supported by a modified pedestal having a shock-absorbing seat mounting.

Another modified version of the pedestal 16 of FIG. 1 is shown in FIG. 8 and generally denoted by numeral 68. This embodiment of FIG. 8, provides a shock-absorber arrangement for the seat portion 18 to give a softer ride. In this arrangement, the center web 28 is enlarged by a centrally disposed cylindrical portion 70. A vertical shaft 72 is slidably disposed through a small bore 74 at the top of pedestal 68; the lower end of the shaft 72 slidably engages in a similar size bore 76 in a bushing 78 seated in a larger bore 80 in the pedestal extending from the small bore 74 to the bottom of the pedestal. A coiled compression spring 82 is placed in the larger bore 80 between the top of bushing 78 and an annular flange or shoulder portion 84 provided on the shaft 74 intermediate the length thereof. The shaft 74 is placed in the larger bore 80 from the bottom with the shoulder 84 engaging against a bottom shoulder of the small bore 74. Then the spring 82 is inserted in bore 80 and around shaft 72. Thereafter, bushing 80 is inserted into the position shown. The pedestal 68 is then secured to the ski 12 by screws 38 as previously described. This retains the spring 82 and bushing 80 in place. If desired, they may be held in place by the spacer 56 or spacer halves 62 as shown in FIGS. 5 and 7. After this much is assembled, the shaft 72, which includes tapered pipe threads 86 on its upper end, is screwed into a base plate 88. The base plate 88 is secured to the seat portion 18 by screws 38 in the manner previously described. The weight of a rider on the seat slightly compresses spring 82. Further impact of bumps on the bottom of the ski 12 during downhill advancement will be further absorbed by the spring thereby cushioning the rider against such shocks. The shoulder or flange 84 on shaft 72 prevents the shaft from coming out of the cylindrical portion 70. A key 90 seated in cooperating keyways 92 and 94 in the bore 74 and shaft 72, respectively, prevents the seat 18 from rotating in the cylindrical portion 70. The key 90 is preferably vertically slidable in at least the keyway 92 in the cylindrical portion 70.

Figure 9:
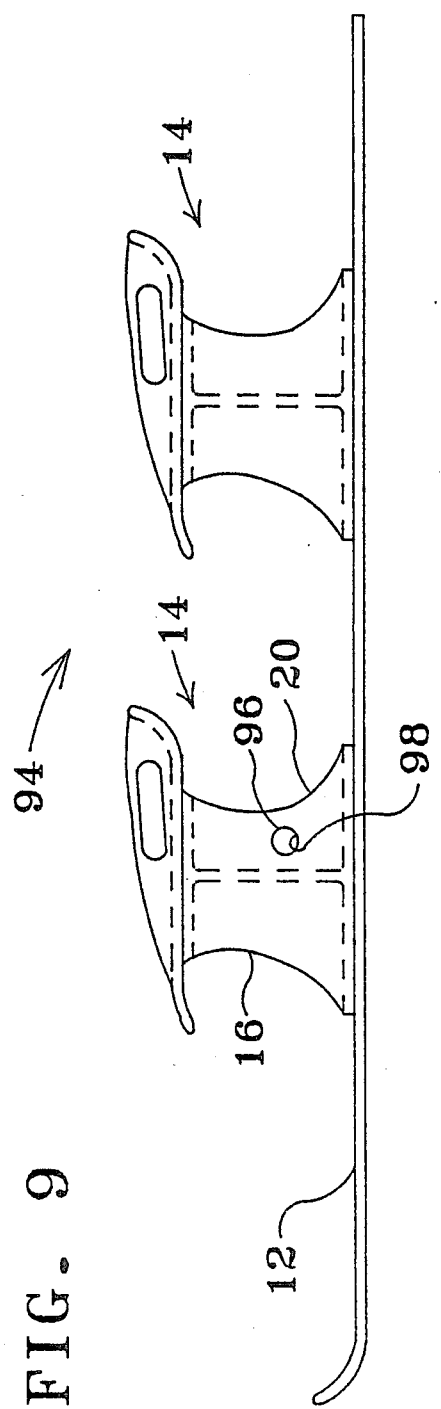
FIG. 9 is a side elevation of a conventional ski upon which are mounted two seat assemblies in tandem in accordance with the invention.

The ski-sled 10 may also be adapted for two riders, such modification being denoted by numeral 94 in FIG. 9. In this embodiment, two seat members, such as seat members 14 in FIG. 1, are attached to the ski 12 in the same manner as described in connection with FIG. 1. They may alternatively be attached as described in connection with FIGS. 3, 5, 7, and 8. The seat members 14 are spaced along the ski 12 on centers about 24 to 36 inches apart, being substantially equidistant from the longitudinal center of the ski. If desired, a foot rest for the rear rider may be incorporated in the front seat member 14. The foot rest can take the form of a peg 96 extending through holes 98 in the sides 20 of the pedestal 16, and extending about 6 inches outboard of each side.

The seat member 14 may also be mounted to a grass ski made by the Rollka Company in Italy and marked with Pat. No. 973007 which the applicant has been unable to identify. Nevertheless, it is available in sporting goods stores in the United States.

Figure 10:
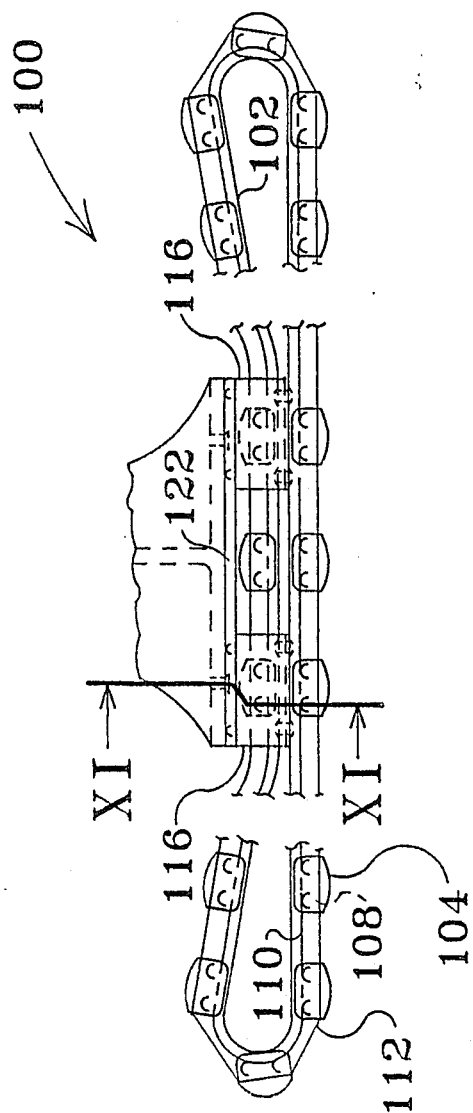
FIG. 10 is a side elevation of a conventional grass ski with a seat member attached to it in a similar manner to the seat fastening arrangement shown in FIG. 1.
Figure 11:
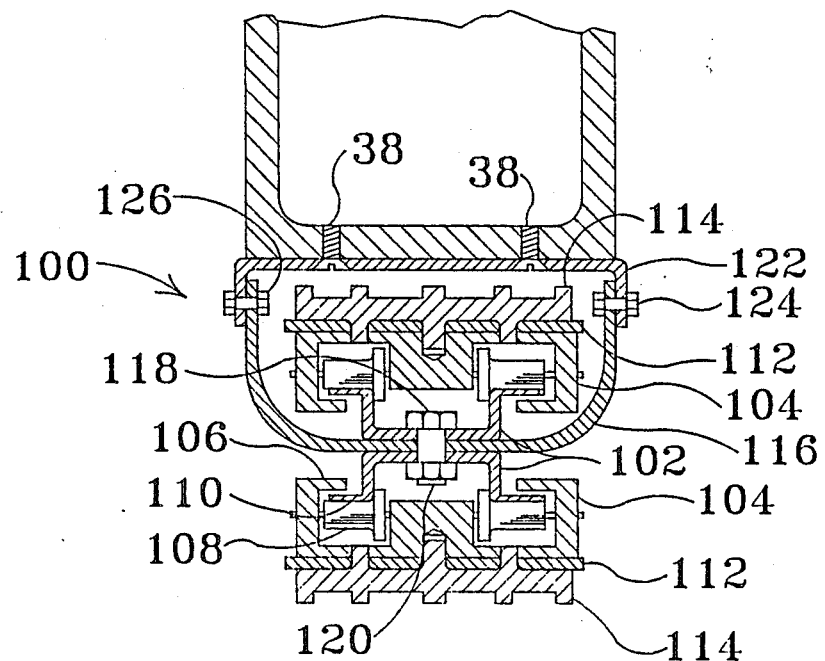
FIG. 11 is a section view taken along the line XI-XI in FIG. 10.

In essence, the grass ski, denoted by numeral 100 in FIGS. 10 and 11, includes a steel track 102 of a hat shape in cross-section (FIG. 11) which is formed in an elongated closed loop (FIG. 10). A plurality of wheeled carriages 104 are captured on the track 102 by guide portions 106 with wheels 108 resting on outer flanges 110 of the track 102. The carriages 104 are spaced around the track 102 at equidistant intervals of about 4 inches, the total length of the track being about 23 inches from end to end.

The carriages are kept in position around the track 102 by means of a tough woven nylon (or similar fabric) belt 112. Cleats 114 with spike-like detents punched through the belt 112 and into the carriages 104 fasten the belt 112 to the carriages 104. Thus, it can be seen that the cleats on the bottom of the track 102 and in contact with the ground (not shown) will, upon forward motion of the track, cause the belt carriage and cleat assembly to move around the track 102. The top run of the track 102 is bent downward as shown in FIG. 10 to nearly touch the bottom run in the longitudinal center of the track. A pair of U-shaped support members 116 are sandwiched between the top and bottom run in the mid-portion of the track where they are held in place by bolts 118 and nuts 120. A boot support 122 spans the tops of both supports 116 and is held in place by bolts 124 and nuts 126. Ordinarily, the boot support 122 includes a conventional toe support and heel clamp (not shown) for holding a ski boot on the boot support. Thus, to ski on the grass, a grass ski 100 is placed on each foot and the grass skier coasts down a grass covered slope in much the same manner as a snow skier on conventional snow skis.

According to an embodiment of the present invention, the toe support and heel clamps are dispensed with. Instead, a pedestal, such a pedestal 16 in FIG. 1, is secured to the boot support 122 on a ski 100 by screws 38. A seat portion 18 is secured to the pedestal 16 as previously described. According to another embodiment, the support 122 may be adapted to receive a pedestal with a spacer to be clamped thereto as previously described in relation to FIGS. 3, 5 or 7. In this manner, a rider may be seated on the grass ski 100 to ride down grass covered slopes.

In operation, for example with respect to FIG. 1, a rider sits astride the seat portion 18 with both feet planted on the ground. By pushing with his feet, the ski-sled 10 is caused to move forward and down a snow covered slope. When sufficient momentum is achieved, the rider lifts his feet, with legs outstretched, in a wide stance while holding on to the handholes 36 and balancing like when riding a bicycle. The legs are additionally used for balance, and by carefully leaning to the right or left, the rider can steer or guide the ski-sled in much the same manner as a skier controls conventional skis using his/her weight on the edges of one's skis. This same approach is used in using the grass ski described in connection with FIGS. 10 and 11.

Accordingly, this invention provides a recreational vehicle combining advantages of both snow or grass skis with those of a snow sled, requiring perhaps less skill than a conventional skier but more skill than a sledder, and providing new thrills and excitement in use.

The above described embodiments, of course, are not to be construed as limiting the breadth of the present invention. Modifications, and other alternative constructions, will be apparent which are within the spirit and scope of the invention as defined in the appended claims.

What is claimed is:

1. A recreational vehicle upon which a rider may ride down a slope, comprising:
   a runner member extending in a longitudinal direction;
   a seat member secured to the runner member;
   said seat member including a seat portion and a pedestal support member, said seat portion being secured to said pedestal support member and said pedestal support member being readily releasably secured to said runner member;
   said runner member being a ski with spaced apart ski bindings;
   vertically disposed, removable and replaceable, spacer members which are changed in number for selectively changing a dimension in said longitudinal direction of said pedestal support member to a size dependent upon the spacing between said ski bindings;

two adaptor members engageable with said ski bindings to be releasably clamped thereby to said ski; and means for securing said adaptor members to said support member with said spacer members sandwiched between said adaptor members and vertical surfaces of said support member.

2. The recreational vehicle of claim 1, wherein said seat portion is secured to a shock-absorbing member movably and resiliently supported within said pedestal support member to provide a shock-absorbing support for said seat portion.

3. The recreational vehicle of claim 2, wherein:
said resilient shock-absorbing member comprises a rod member slidably seated in an elongated opening in said pedestal support member;

said rod member including a shoulder portion engageable with a constraining shoulder portion in said elongated opening to retain said rod member in said elongated opening; and spring means, in said elongated opening acting against said shoulder portion on said rod member, for biasing said seat portion away from said runner member but being compressible by the weight of a rider on said seat portion and further compressible by shock forces applied to the bottom of said runner member.

4. The recreational vehicle of claim 1, further comprising a second seat member secured to said runner, the two seat members being arranged in tandem one behind the other on said runner.

5. The recreational vehicle of claim 1, wherein said seat portion has hand grips.

6. The recreational vehicle of claim 5, wherein said seat portion has upturned sides and said hand grips are formed as hand holes through said upturned sides.

7. The recreational vehicle of claim 1, wherein said securing means comprises at least one rod extending parallel to said longitudinal direction.

8. The recreational vehicle of claim 7, wherein said rod is threaded and has a nut threadedly engaged on each end.

9. The recreational vehicle of claim 8, wherein the nuts engage in recesses in said adaptor members.

10. The recreational vehicle of claim 1, wherein said securing means comprises a plurality of rods extending through said adaptor members, spacer members and support member parallel to said runner member.

11. The recreational vehicle of claim 1, wherein said adaptor members have protruding lug portions extending away from each other in said longitudinal direction and releasably captured in said ski bindings.

12. A recreational vehicle for use on snow, comprising:
a snow ski comprising a runner extending in a longitudinal direction and having a pair of ski bindings thereon spaced apart in said longitudinal direction to accept a ski boot of a specific size;
a seat;
means for detachably mounting said seat on said runner using said ski bindings; and said mounting means comprising two adaptors configured to be releasably captured in said ski bindings, and a plurality of vertically disposed slice-like spacers sandwiched between said adaptors, the number of spacers being selectively increased or decreased to adjust the spacing between said adaptors to match the specific size ski boot for which the ski bindings are spaced apart.

13. The recreational vehicle of claim 12, wherein said seat comprises a seat portion mounted on a pedestal, said adaptors are disposed on opposite sides of said pedestal, and said adaptors and the spacers are secured together and to said pedestal by at least one securing member.

14. The recreational vehicle of claim 13, wherein said pedestal is rectangular in cross-section parallel to said runner, and said pedestal is sandwiched between the spacers.

15. The recreational vehicle of claim 13, wherein said securing member comprises a rod extending through said pedestal and the spacers in said longitudinal direction.

16. The recreational vehicle of claim 13, wherein the spacers are disposed on both said opposite sides of said pedestal, and the spacers extend upwards differing heights above said runner with upper surfaces of the spacers forming an upward taper inclined towards said pedestal on both said opposite sides thereof.

17. The recreational vehicle of claim 12, wherein the slice-like spacers each have a thickness in said longitudinal direction equal to a half ski boot size increment.

18. The recreational vehicle of claim 12, wherein said adaptors have protruding lug portions extending away from each other in said longitudinal direction, and said mounting means includes a longitudinal fastening member extending in said longitudinal direction and securing said adaptors together and to said seat.

19. A seat structure for converting a single conventional snow ski with conventional ski bindings into a sled-like recreational vehicle upon which a rider may sit while sliding down a snow covered slope, comprising:
a seat having a seat portion mounted on top of a support pedestal;
means, connected to a bottom portion of said support pedestal, for detachably mounting said seat on the single conventional snow ski using the ski bindings thereof; and said mounting means comprising two spaced apart adaptors configured to be releasably captured in the ski bindings, a plurality of slice-like spacers disposed on opposite sides of said pedestal bottom portion and sandwiched between said pedestal and said adaptors, and at least one releasable fastening member securing said adaptors together and to said pedestal, the number of slice-like spacers being selectively increased or decreased to space apart said adaptors an appropriate distance to match the specific boot size for which the ski bindings of the snow ski are adapted to accept.

20. The seat structure of claim 19, wherein the slice-like spacers each have a thickness in said longitudinal direction equal to a half ski boot size increment.

* * * * *